April 5, 1938.  E. G. DORGELO  2,113,194
PROJECTING APPARATUS
Filed Feb. 10, 1937  2 Sheets-Sheet 1
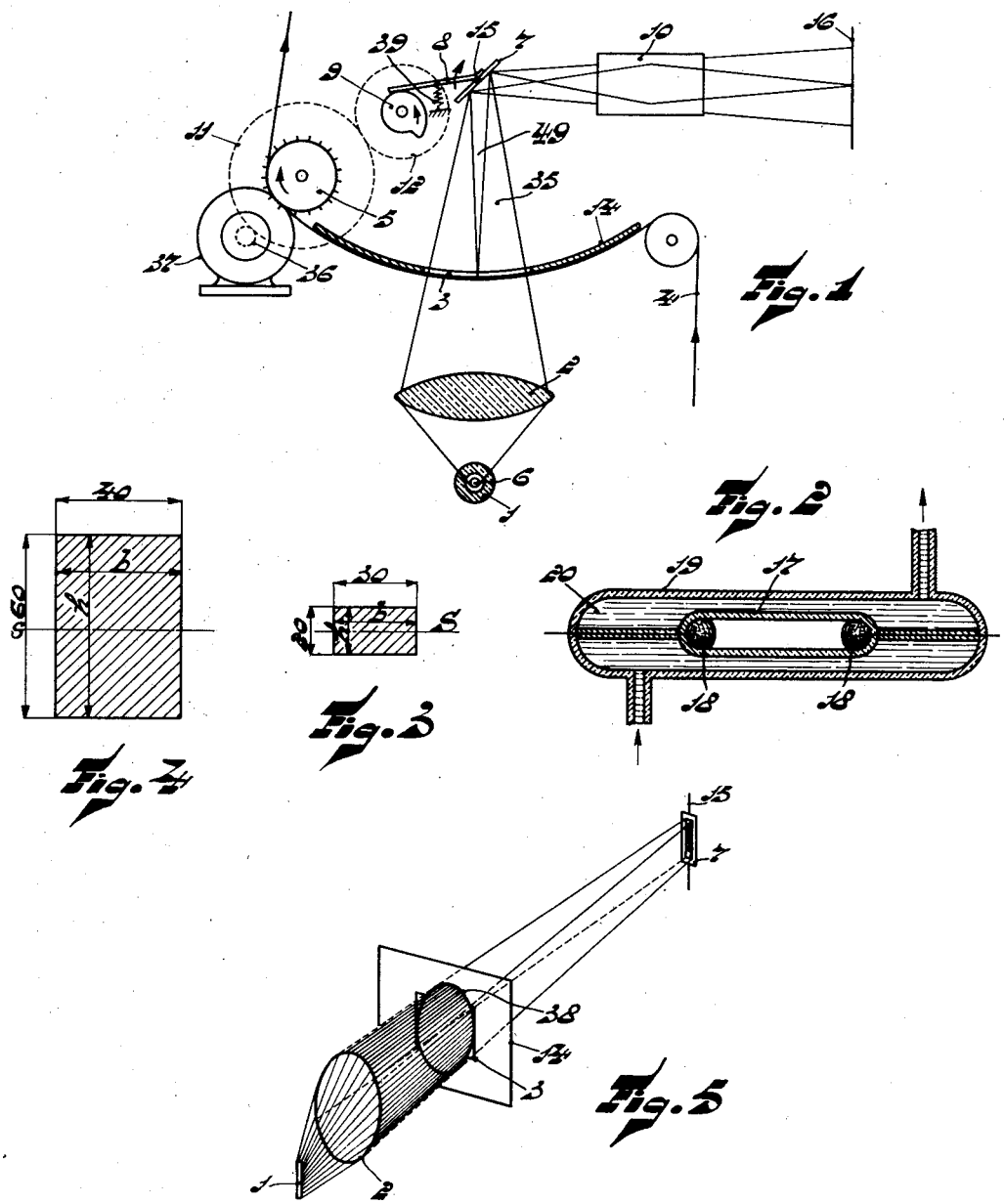
INVENTOR
Eduard Gerardus Dorgelo
BY E. F. Wenderoth
ATTORNEY April 5, 1938.  E. G. DORGELO  2,113,194
PROJECTING APPARATUS
Filed Feb. 10, 1937  2 Sheets-Sheet 2
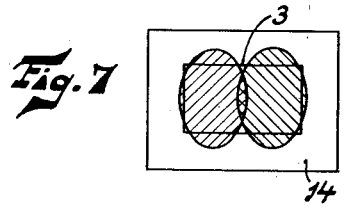
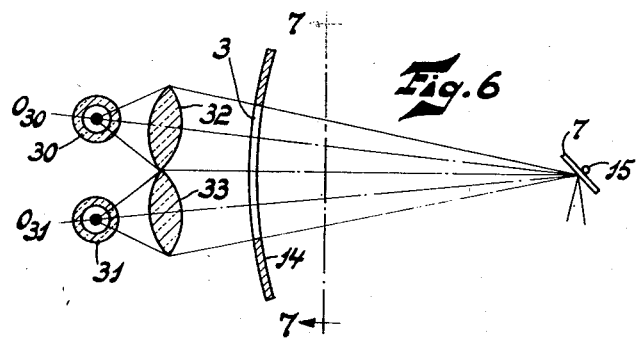
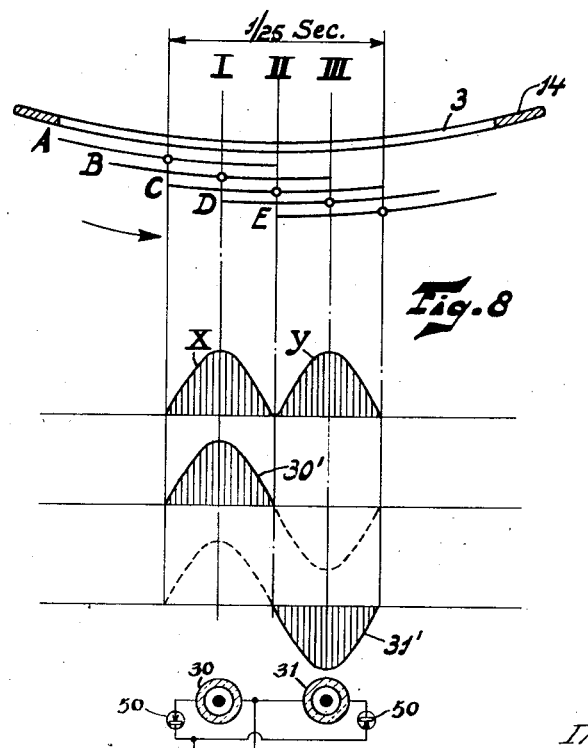
INVENTOR
Eduard Gerardus Dorgelo
BY C. F. Wenderoth
ATTORNEY Patented Apr. 5, 1938

2,113,194

UNITED STATES PATENT OFFICE 2,113,194

PROJECTING APPARATUS

Eduard Gerardus Dorgelo, Eindhoven, Netherlands, assignor to N. V. Philips' Gloeilampenfabrieken Application February 10, 1937, Serial No. 125,125
In Germany February 13, 1936

7 Claims. (Cl. 88—16.8)

My invention relates to projecting apparatus, and more particularly to projecting apparatus in which a film moves continuously past the picture gate, and the pictures are projected by optical compensation.

I shall describe my invention in connection with picture-films and optical compensating systems using an oscillatory mirror, however it is equally applicable to sound-picture films, and to compensating systems using other types of moving reflecting members, such as prisms.

To eliminate the intermittent motion of the film, numerous types of optical compensating devices have been proposed. For example, in one type of device a mirror is vibrated in a predetermined manner with respect to a continuously-moving film to reflect upon the screen, a stationary projection of each picture as it continuously moves past the picture aperture. Such devices, however, are of complicated construction, expensive, and the mechanism for actuating the mirror must be so accurate that it cannot be manufactured commercially.

The above difficulties are in a large measure due to the arc lamps in general use in theater projectors. More particularly to produce a sufficiently intense picture upon the screen such lamps must have a comparatively large crater surface, and to obtain a high illumination efficiency the opening angle of the condenser lens must be large, i. e. the crater of the arc lamp must be arranged as close as possible to the lens. Such an arrangement, however, necessitates the use of a large surface-area mirror, because the reproduction upon the mirror by the condenser lens of that portion of the light beam which emanates from the crater and is bounded by the picture aperture, is materially increased.

Theoretically, it is possible to reduce the size of the mirror by using a condenser lens which projects upon the mirror a picture which is only slightly increased or even reduced. However, in such cases, the distance between the condenser lens and the crater would have to be so great that the opening angle of the condenser lens would be small and as a result the illumination efficiency would be reduced to an inadmissible degree. Even if the mirror were arranged at the smallest cross-section of the light beam its dimensions could not be reduced sufficiently to enable the obtainance of a simple device without particular measures and without substantial light losses.

In addition—particularly with the high-intensity arc lamps used for standard film projectors—the mirrors must be considerably larger than required for the above reasons. This is because the luminous arc of such lamps also participates in the light emission, and moves back and forth whereby the luminous spot produced on the mirror by the condenser lens has a varying magnitude. From the above it is seen that the mirrors at present used in such device have a large surface area.

Such large surface-area mirrors are very disadvantageous because they must be rigidly constructed to prevent a resonance which would mar the picture reproduction, and this also necessitates a heavy construction of the compensating device and its driving mechanism. Furthermore, the mirrors have such a large moment of inertia about their axis of oscillation that, when used without a shutter, their returning movement is so slow that it is visible upon the screen. In addition the long returning time, which may be about 25% of the time required for a picture to move past the picture aperture, results in a substantial loss of light, which is about doubled when each picture is illuminated twice during its projection to avoid flickering; as is the general practice.

Incidentally, arc lamps have various known disadvantages, for example, a large lamp casing is required, there is a large production of heat and ashes, a complicated automatic regulating device is necessary, and the comparatively great distance of the crater from the condenser lens increases the overall size of the apparatus.

The main object of my invention is to overcome the above difficulties, and to provide an optical-compensating projecting apparatus which is simple in construction, small in size, and can be manufactured commercially.

Another object of my invention is to produce a shutterless optical-compensating projecting apparatus.

In accordance with the invention, I use as a light-source, one or more artificially-cooled high-pressure metal-vapor discharge tubes having contracted or line-shaped discharge paths, and a picture aperture having a width about double the picture height. I so arrange one or more of such tubes, the condenser lens, and the compensating mirror that the discharge path or paths are substantially parallel to the axis of oscillation of the mirror and are reproduced on the surface of the mirror or in its proximity.

With such an arrangement, the mirror has an exceedingly small width normal to its axis of the oscillation thus a small moment of inertia about this axis, whereas its axial length—which only slightly influences the moment of inertia—may be substantially larger. Because of this small moment of inertia, the mirror may be returned to its initial position, preferably without the use of a shutter, during a dark period of the periodic emission of the tube, which periodic emission may be produced by energizing the tube with intermittent direct current, or alternating current. In fact the mirror may be given such a small moment of inertia and may be returned so quickly that satisfactory projection is obtained without a shutter when the mirror is not returned during the dark periods or when the discharge tube has a continuous emission.

In many cases, for example, when it is necessary to obtain the highest quality projection in large theaters, I prefer to use a plurality of discharge tubes each preferably provided with a condenser lens to thereby ensure that the film portion at the picture aperture is illuminated more evenly. According to a further embodiment of my invention, I arrange a plurality of tubes in such manner relatively to the film aperture that the light beams emitted thereby cover the picture aperture side by side as a prolongation of each other. In this case the axis of the optical systems are preferably so arranged relative to each other that the images of the discharge paths formed on the mirror coincide. Thus, the additional advantage is obtained that a brighter and more evenly-illuminated picture is projected on the screen, while at the same time the dimensions of the mirror are kept to a minimum.

Also in this case, the light sources may be periodically energized and the mirror returned to its initial position during the dark periods. However, as a harmful vacillation generally occurs if each picture is illuminated only once, I prefer to illuminate each picture at least twice on its passage through the film gate; each picture being illuminated in succession at least once by each of the light sources.

Further features and advantages of my invention will appear as the description progresses.

In order that my invention may be clearly understood and readily carried into effect, I shall describe the same more fully with reference to the accompanying drawings, in which Fig. 1 is a diagrammatic view of portions of a projecting apparatus embodying the invention.

Fig. 2 is a sectional view of a discharge tube for use in Fig. 1.

Figs. 3 and 4 are dimensional views of mirrors according to the prior art and according to the invention.

Fig. 5 is a diagrammatic view showing the path of light rays in Fig. 1.

Fig. 6 is a diagrammatic view showing the use of a plurality of light sources.

Fig. 7 is a sectional view along line 7—7 of Fig. 6, and

Fig. 8 is a diagram illustrating a particular embodiment of the invention.

The projecting apparatus, schematically shown in Fig. 1, comprises a film guide 14 provided with a picture aperture 3 whose width in the plane of the drawing is about double the picture height. A picture film 4 is continuously moved past aperture 3 by a sprocket roller 5 driven in known manner by the motor 37 through the gears 36 and 11 at a constant speed. Rotatably mounted upon an axis 15 is a compensating mirror 7 provided with an arm 8 moved under the tension of the spring 39 and cooperating with a cam 9 rotated at a constant speed through gears 36, 11 and 12. An optical system 10 of known type is disposed between the mirror 7 and a projecting screen 16.

Disposed on the side of the film guide opposite the mirror, is a condenser lens 2 and a light source 1 having a contracted or linear discharge path 6.

As the light source 1, I prefer to use liquid-cooled, high-pressure mercury-vapor discharge tubes having a contracted discharge path and a gaseous filling, and having, when in use, a mercury-vapor pressure exceeding 6 atms., for example 150 atms., and comprising one or more incandescent electrodes which extend but slightly from a surrounding quantity of vaporizable metal containing mercury or amalgam. Such discharge tubes which have been described in the copending U. S. patent application Ser. No. 46,952 to Bol et al. filed Oct. 26, 1935 now Patent #2,094,694, have many advantages. For example, they have an intrinsic brilliance of at least 20,000 int. candles per sq. cm., for example, of 80,000 to 100,000 int. candles per sq. cm., and the spectrum of their emitted light satisfy to a high extent the projection requirements. In addition such tubes during their operation produce no dust or ashes so that the projection apparatus is not soiled and the films are not damaged by scratching. Furthermore, these tubes require no supervision during their operation, and their discharge paths always occupy the same position within the tubes whereby the tubes need be positioned correctly only once. Thus, the use of special devices, for example devices to control the spacing between the carbon points of arc lamps can be eliminated and this alone substantially simplifies the apparatus.

One example of such a tube is illustrated in Fig. 2 in which reference numeral 17 indicates a transparent envelope, for instance of quartz, in which are disposed two mercury electrodes 18. The tube is surrounded by a cooling jacket 19 of transparent material through which cooling water is circulated as indicated by the arrows.

Referring now to Fig. 1, the tube 1 and the condenser lens 2, are so arranged that the picture of the approximately line-shaped discharge path 6 is produced on the mirror surface of mirror 7, whereas mirror 7 is so arranged that its axis of oscillation 15 is parallel to the discharge path 6. As indicated in this figure, the rays reflected by mirror 7 are then thrown in well known manner by the optical system 10 upon a screen 16.

From Fig. 1 it appears that lens 2 projects on the surface of the mirror, or in its proximity, an approximately line-shaped image of the substantially line-shaped discharge path 6. If the film guide 14 with picture aperture 3 were not provided, the beam of light leaving lens 2 would have an approximately circular section at the film guide, and its sections would become more elliptical with a constantly decreasing axis in the plane of the drawing toward the mirror, with the section of narrowest cross axis at the mirror. However, as shown in Fig. 5, the approximately circular cross-section 38 of the light beam behind lens 2 is bounded by the rectangular picture aperture 3 whose longitudinal axis is normal to that of the mirror. Thus, the light beam which emerges from the picture aperture is concentrated by the lens 2 to form a beam of rectangular cross-section having a longitudinal axis which is preferably normal to the longitudinal axis of the picture gate and parallel to the longitudinal axis of the mirror. If an arc lamp were used, the originally circular image of the crater would be bounded on the mirror surface by the picture gate in such a manner that a rectangular mirror having a longitudinal axis normal to the axis of oscillating would be required. Thus the invention permits the use of a small mirror having a very small moment of inertia.

This reduction in size of the mirror is shown in Figs. 3 and 4 which illustrate respectively a mirror for use in the present invention, and a mirror for use with an arc lamp. The moment of inertia of the mirrors can be calculated in a simple manner by the formula $\tfrac{1}{12} bh^3$. The mirror of Fig. 4 has a height $h$ of about 60 mms., and a width $b$ of about 40 mms., which results from the fact that the center of the arc is circular and the mirror is at 45° to the beam, thus the projection on the surface of the mirror is an ellipse having its longitudinal axis normal to the axis of oscillation. The moment of inertia of the mirror of Fig. 4 taken about the axis of oscillation S is 72 cm$^4$, whereas the moment of inertia for the mirror of Fig. 3 is only 2 cm$^4$. From this it appears that the moment of inertia of the mirror of Fig. 3, as used in the present invention, is substantially negligible with respect to mirrors used with arc lamps.

In Fig. 1 the reference numeral 35 indicates the projecting beam through the film gate, whereas reference numeral 49 indicates the scanning light beam of a point of the image. From this it is seen that the small mirror 7 is sufficiently large to receive the entire projecting beam.

Due to its small moment of inertia about its axis of oscillation, a mirror according to the invention can be returned to its initial position during a dark period in the periodical emission of light by the tube, which emission can be effected by supplying the tube with intermittent direct current or with alternating current. As discharge tubes of the above described type have the property of exhibiting dark periods of definite duration without the use of special measures such as chokes, resistances and the like, and as the mirror may be returned in a simple manner in less than 1/100 of a sec., for instance 1/150 of a sec., the return of the mirror may be effected substantially within the dark period and thus shutter devices may be eliminated.

Furthermore, due to the high intrinsic brilliance of the tubes, the total useful light completely suffices and meets the conditions necessary for the projection of standard films in large theaters, in spite of the fact that the mirror of the invention has only a small surface area, for example, 20 mm. by 30 mm. In fact, this total light emission is concentrated upon a smaller mirror but this has no other consequences than a little more heating of the mirror which is, however, of no importance.

Furthermore, the moment of inertia can be made so small that the mirror can be returned in a still shorter time, for example in from 1/400 to 1/500 seconds. Thus, with standard film apparatus, satisfactory projection can be obtained even if the dark periods are not in agreement with the return movement of the mirror, or if the discharge tube is supplied with uninterrupted direct current. However, I prefer to synchronize the movement of the mirror and the periods of light emission.

In the arrangement shown in Fig. 6, two light-sources 30 and 31, similar to source 1 of Fig. 1, are each provided with a condenser lens 32 and 33 in such manner that their emitted light beams cover the picture aperture 3 side by side in prolongation of each other (see Fig. 7). Thereby the entire picture aperture is evenly illuminated, and as each light-source illuminates only half the aperture, a substantially higher intrinsic brilliance is produced which results in a brighter projection on the screen. The optical axes $O_{30}$ and $O_{31}$ of the illuminating systems corresponding to light sources 30 and 31 respectively, are so inclined to each other that they intersect in a point on mirror 7 whereby the images of the discharge paths of the tubes on the mirror coincide.

As has been stated above, the light-sources are preferably intermittently energized, for example by supplying them with interrupted direct current, or alternating current. In this case it is preferable to return the mirror to its initial position during the dark periods in the light emission. However, if during the projection of a picture on the screen, the luminous emission occurs but once, i. e. without interruption, a well known flickering results. This disadvantage can be obviated in the well known manner by illuminating each picture at least twice during its passage through the film gate.

According to a further feature of my invention, as illustrated in Fig. 8, each picture is illuminated in succession at least once by each of the sources of illumination, whereby each picture is illuminated at least twice during its projection and thus the flickering is materially reduced. In the example illustrated in Fig. 8, the image frequency is assumed to be 25 pictures per second and the two discharge tubes 30 and 31 are assumed to be energized with 25 cycle. The film moves in the direction of the arrow and the various positions of a picture in front of the picture aperture 3 are indicated by letters. At position A, the entire picture has just moved within the picture aperture and at this moment the light emission of light source 30 starts as indicated by curve X. The maximum light emission of source 30 occurs at the moment I when the picture reaches position B, at which position the picture is illuminated to the maximum extent. At the moment II, i. e. at the moment when the picture occupies position C at the center of the film gate, no light emission of either source occurs. In position D, the picture receives the maximum amount of light from light source 31, as indicated by curve Y, whereas when the picture is in position E it is just about to leave the picture aperture and there is no emission from either light source. Therefore it follows, that it is of advantage to arrange the two light sources 30 and 31 in the lines I and III since at the moment of maximum light emission the picture is just stationary in front of one of the sources so that the illumination is as even as possible. To effect a saving of current a half-cycle of each light source can be suppressed, as indicated by curves 30' and 31'.

As shown in Fig. 8, light sources 30 and 31 are energized from an A. C. supply of a frequency of 25 cycles, through rectifiers 50.

My invention is not limited to standard film apparatus but is equally well adapted for use in narrow film apparatus, for instance 8 or 16 mm. projecting apparatus.

While I have described my invention in connection with specific examples and applications, I do not wish to be limited thereto but desire the appended claims to be construed as broadly as permissible in view of the prior art.

What I claim is:—

1. A picture-projecting apparatus comprising a film guide provided with a picture aperture having a width substantially twice the height of the pictures to be projected, means to continuously move a film past said aperture, optical-compensating means including an oscillatory reflecting member, an artificially-cooled high-pressure metal-vapor discharge tube having a contracted discharge path arranged substantially parallel to the axis of oscillation of said reflecting member, and a condenser lens disposed between said reflecting member and tube to reproduce said discharge path substantially at the surface of said reflecting member.

2. A picture-projecting apparatus comprising a film guide provided with a picture aperture having a width substantially twice the height of the pictures to be projected, means to continuously move a film past said aperture, optical-compensating means including an oscillatory reflecting member, a liquid-cooled high-pressure mercury-vapor discharge tube having a contracted discharge path arranged substantially parallel to the axis of oscillation of said reflecting member, and a condenser lens arranged between said tube and member to reproduce said discharge path substantially at the surface of said reflecting member.

3. A picture-projecting apparatus comprising a film guide provided with a picture aperture having a width substantially twice the height of the pictures to be projected, means to continuously move a film past said aperture, optical-compensating means including a reflecting member adapted to be oscillated about an axis, said member having a width normal to the said axis of less than 20 mm. and a length in the direction of the axis of less than 30 mm., an artificially-cooled high-pressure metal-vapor discharge tube having a contracted discharge path arranged substantially parallel to the axis of said member, and a condenser lens arranged between said reflecting member and tube to reproduce said discharge path substantially at the surface of the member.

4. A picture-projecting apparatus comprising a film guide provided with a picture aperture having a width substantially twice the height of the pictures to be projected, means to continuously move a film past said aperture, optical compensating means including an oscillatory reflecting member, a plurality of liquid-cooled high-pressure metal-vapor discharge tubes each having a contracted discharge path arranged substantially parallel to the axis of oscillation of said reflecting member, and condenser means arranged between said tubes and member to reproduce said discharge paths substantially at the surface of said reflecting member, the beams of light emitted by said tubes covering the picture aperture side by side as a prolongation of each other.

5. A picture-projecting apparatus comprising a film guide provided with a picture aperture having a width substantially twice the height of the pictures to be projected, means to continuously move a film past said aperture, optical-compensating means including an oscillatory reflecting member, a plurality of artificially-cooled high-pressure metal-vapor discharge tubes each having a contracted discharge path arranged substantially parallel to the axis of oscillation of said reflecting member, and condenser means arranged between said reflecting member and tubes to reproduce on the surface of the member coincident images of said discharge paths.

6. A picture-projecting apparatus comprising a film guide provided with a picture aperture having a width substantially twice the height of the pictures to be projected, means to continuously move a film past said aperture, optical-compensating means including an oscillatory reflecting member, a plurality of liquid-cooled high-pressure metal-vapor discharge tubes each having a contracted discharge path arranged substantially parallel to the axis of oscillation of said reflecting member, the beams of light emitted by said tubes covering the picture aperture side by side as a prolongation of each other, condenser means arranged between said tube and member to reproduce said discharge paths substantially at the surface of said reflecting member, and means to periodically energize said tubes, each picture during its passage across the picture aperture being illuminated at least twice and being successively illuminated at least once by each of the tubes.

7. A picture-projecting apparatus comprising a film guide provided with a picture aperture having a width substantially twice the height of the pictures to be projected, means to continuously move a film past said aperture, optical-compensating means comprising a reflecting member adapted to be oscillated about an axis, and means to oscillate said member from one pre-determined position to a second predetermined position in accordance with the movement of the film and to return the member from said second position to said first position in less than 1/100 of a second, an artificially-cooled high-pressure metal-vapor discharge tube having a contracted discharge path arranged substantially parallel to the oscillatory axis of said member, and a condenser lens disposed between said member and tube to reproduce said discharge path substantially at said member.

EDUARD GERARDUS DORGELO.